(12) United States Patent
Vavrusa et al.

(10) Patent No.: US 10,033,692 B1
(45) Date of Patent: Jul. 24, 2018

(54) MANAGING DOMAIN NAME SYSTEM (DNS) QUERIES USING A PROXY DNS SERVER

(71) Applicant: Cloudflare, Inc., San Francisco, CA (US)

(72) Inventors: Marek Vavrusa, San Francisco, CA (US); Dani Grant, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 15/726,309

(22) Filed: Oct. 5, 2017

(51) Int. Cl.
| | |
|---|---|
| G06F 15/16 | (2006.01) |
| H04L 29/12 | (2006.01) |
| H04L 29/08 | (2006.01) |
| H04L 29/06 | (2006.01) |

(52) U.S. Cl.
CPC ...... H04L 61/1511 (2013.01); H04L 61/6009 (2013.01); H04L 61/6013 (2013.01); H04L 61/6068 (2013.01); H04L 67/2842 (2013.01); H04L 63/0281 (2013.01)

(58) Field of Classification Search
CPC ............. H04L 61/1511; H04L 61/6009; H04L 61/6013; H04L 61/6068; H04L 67/2842; H04L 63/0281; H04L 29/12066; H04L 29/12811
USPC ........................................................ 709/245
See application file for complete search history.

(56) References Cited

U.S. PATENT DOCUMENTS

| | | | | |
|---|---|---|---|---|
| 7,970,878 B1* | 6/2011 | Burshan | ............. | H04L 63/0236 370/255 |
| 2010/0118869 A1* | 5/2010 | Li | .................... | H04L 29/12066 370/389 |
| 2010/0274970 A1* | 10/2010 | Treuhaft | .......... | H04L 29/12066 711/118 |
| 2012/0117458 A1* | 5/2012 | Holloway | .......... | H04L 61/1511 715/234 |
| 2014/0344925 A1* | 11/2014 | Muthiah | ............ | H04L 61/1511 726/22 |
| 2015/0256508 A1* | 9/2015 | Townsend | .............. | H04L 61/20 709/245 |

* cited by examiner

*Primary Examiner* — Ruolei Zong
(74) *Attorney, Agent, or Firm* — Nicholson De Vos Webster & Elliott LLP (57) ABSTRACT

A proxy server for an authoritative nameserver of a domain receives a query from a requesting device directed to the authoritative nameserver for a resource record associated with the domain. The proxy server receives the query from the requesting device instead of the authoritative nameserver for the domain. The proxy server determines that a cached record for the queried resource record is in cache available to the proxy server but is expired, and queries the authoritative nameserver of the domain for the resource record. In response to determining that the authoritative nameserver of the domain failed to respond with the queried resource record, the proxy server accesses, in the cache available to the proxy server, the cached record for the resource record that is expired, and transmits the expired cached record for the resource record to the requesting device.

21 Claims, 5 Drawing Sheets

MANAGING DOMAIN NAME SYSTEM (DNS) QUERIES USING A PROXY DNS SERVER

FIELD

Embodiments of the invention relate to the field of network communication; and more specifically, to managing DNS queries using a proxy DNS server.

BACKGROUND

The Domain Name System (DNS) is used for translating domain names into IP addresses and is an essential part of the Internet. DNS is composed of nameservers that are typically accessed in a recursive manner to obtain the IP address for a requested domain name. For example, a DNS query is received for "www.example.com" by a nameserver (e.g., an Internet Service Provider (ISP) nameserver). The ISP nameserver generates and sends a DNS query to root DNS nameservers, which can include a plurality of nameservers. A root nameserver responds to the DNS query with an answer including an IP address of one or more authoritative name servers serving the ".com" domain. The nameserver then sends a DNS query to the one or more authoritative name servers for the ".com" domain, which then responds with an IP address of one or more authoritative name servers of the domain "example.com". In some cases, this process is repeatedly performed between the nameserver and the one or more authoritative nameservers until a response is received, where the response can be either an IP address for the requested domain or a server failure message. When the IP address for "www.example.com" is located, the authoritative nameserver for "example.com" sends the IP address to the nameserver. The IP address is then returned to the requesting device, and the requesting device can issue an HTTP request using the IP address for "www.example.com".

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for managing DNS queries by a proxy DNS server for an authoritative nameserver is described. In one embodiment, the proxy DNS server operates between a requesting device (e.g., a DNS resolver that may be operating on a client device) and a DNS nameserver (e.g., a root nameserver, an authoritative nameserver, etc.). The proxy DNS server receives a DNS query from the requesting device and can answer the DNS query with a resource record stored in its cache and/or send a DNS query to the appropriate DNS nameserver(s) to obtain the requested resource record. The proxy DNS server may cache DNS responses it receives from the authoritative DNS nameservers (e.g., according to the Time to Live (TTL) values of the DNS records). This allows for the proxy DNS server to respond to DNS queries by retrieving records from its own cache rather than traversing the chain via a recursive process.

When the proxy DNS server does not have a valid resource record in cache (one in which the TTL value has not expired) and is unable to obtain a valid resource record from the authoritative DNS nameservers, the proxy DNS server may transmit an expired (stale) resource record to the requesting device in response to the DNS query.

Embodiments of the invention provide many technical advantages. Embodiments described herein provide security and performance improvements. For example, the use of a proxy DNS server to receive and process DNS queries on behalf of DNS nameservers, can protect the DNS nameservers from being targeted by attackers, mitigating the risks of denial-of-service (DoS) and/or distributed denial-of-service (DDoS) attacks. In embodiments, the proxy DNS server can be configured to detect indicators of DoS and DDoS attacks, and prevent the attack from flooding the nameservers with fraudulent requests. Detecting messages that are likely fraudulent or intended to spam prior to their transmission to nameservers, conserves bandwidth and resources of the nameservers.

Further, embodiments in which the proxy DNS server can respond to DNS queries by accessing resource records stored in cache by the proxy DNS server also provide benefits. Operating in this manner, the proxy DNS server can provide more resource efficient responses to DNS queries. By avoiding unnecessary recursive DNS queries, processing resources and bandwidth can be conserved. Further, even when the DNS nameservers for a requested domain are down or otherwise inaccessible, the proxy DNS server can provide DNS answers to the requesting device by providing resource records stored in cache, instead of providing a SERVFAIL.

Figure 1:
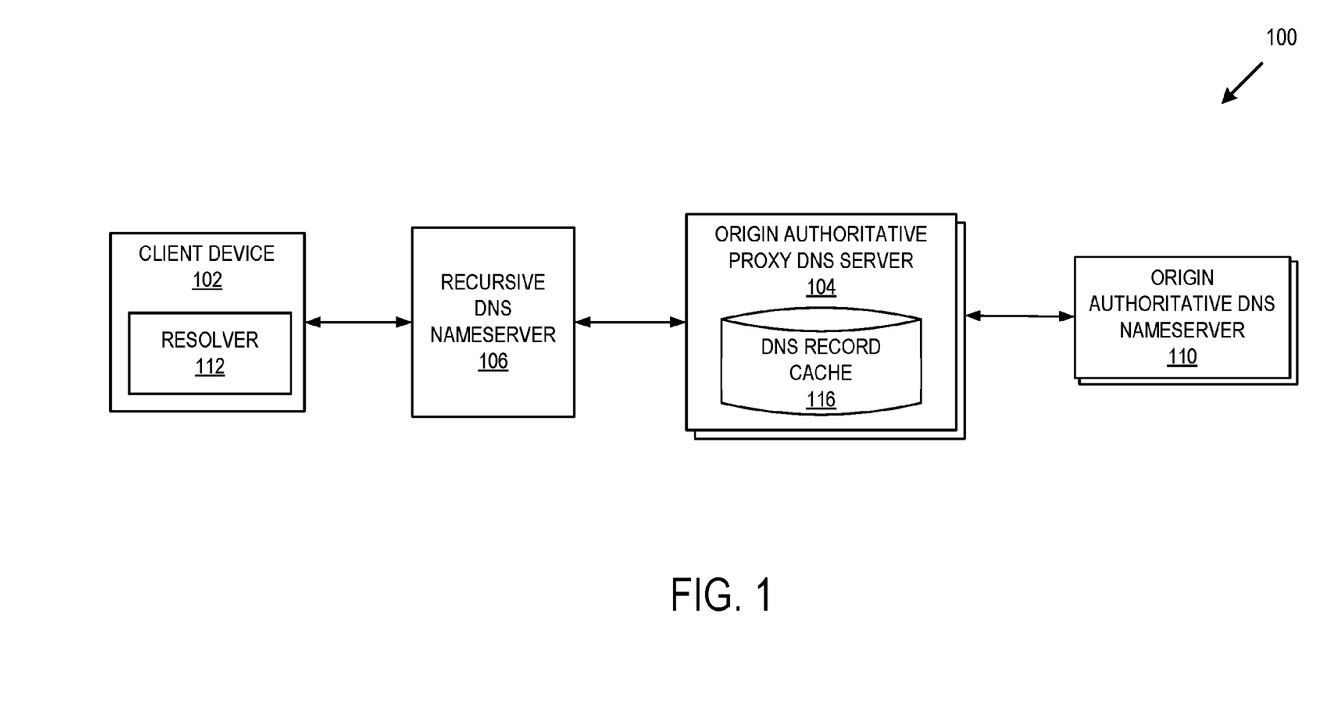
FIG. 1 illustrates an example system including a proxy server for managing DNS queries using a proxy DNS server using techniques described herein according to one embodiment.

FIG. 1 illustrates an example system 100 including a proxy server for managing DNS queries using a proxy DNS server using techniques described herein. FIG. 1 includes a client device 102, an origin authoritative proxy DNS server ("proxy DNS server") 104, a recursive DNS nameserver 106, and an origin authoritative DNS nameserver 110. The devices depicted in FIG. 1 can communicate and exchange data via the internet.

The client device 102 is a device that transmits DNS queries that are received by proxy DNS server 104. For example, the client device 102 includes a resolver 112 that issues DNS queries to, for example, resolve an IP address of a domain. The resolver 112 may be part of the operating system of the client device 102 and may be connected to multiple client programs (email program(s), browser(s), etc.). The user query from the client program is typically an operating system call to the resolver 112. The resolver 112 also could be built into the client program. The resolver 112 is not exposed to the end user. The resolver 112 transmits a DNS query to one or more DNS servers. Typically, the resolver 112 starts with knowledge of at least one name server, which may be configured as part of the settings of the operating system. The client device 102 may be a desktop, laptop, smartphone, etc. that is operated by an end user. Client The client 102 includes client programs that access the Internet such as a web browser or email application. For example, a user may input a domain name into the address bar of their browser (e.g., http://www.example.com) to access that page, which causes the browser to make a request for the IP address mapped to that domain name.

The DNS queries from the client device 102 may be received by the recursive DNS nameserver 106 and transmitted to the proxy DNS server 104. The recursive DNS nameserver 106 may be operated by the Internet Service Provider (ISP) of the client device 102 or by a third-party DNS provider, and may include a resolver that operates in a similar way as the resolver 112. Although not shown in FIG. 1, the recursive DNS name server 106 may transmit queries to root nameservers and/or other authoritative name servers.

The origin authoritative DNS nameserver 110 is the authoritative nameserver for a domain referred sometimes herein as an origin domain. As an example, in this description, the origin authoritative DNS nameserver 110 is the authoritative nameserver for the origin domain "example.com".

The proxy DNS server 104 acts as a proxy for the origin authoritative DNS nameserver 110. The proxy DNS server 104 transmits authoritative answers on behalf of the origin authoritative DNS nameserver 110. The proxy DNS server 104 appears to be the authoritative nameserver for the origin domain; but it is not. The DNS record of the origin authoritative DNS nameserver 110 is changed to point to an IP address of the proxy DNS server 104 instead of an IP address of the origin authoritative DNS nameserver 110. If the origin authoritative DNS nameserver 110 has a name of "ns.example.com", the name "ns.example.com" resolves to an IP address of the proxy DNS server 104 instead of the origin authoritative DNS nameserver 110, as an example. The IP address of the origin authoritative DNS nameserver 110 may be hidden from the general internet. Thus, DNS queries for the origin are received by the proxy DNS server 104 instead of the origin authoritative DNS nameserver 110. The proxy DNS server 104 may be one of multiple distributed proxy DNS servers in the system that are anycasted to the same IP address.

The proxy DNS server 104 does not permanently store DNS records of the origin authoritative DNS nameserver 110. However, the proxy DNS server 104 caches DNS records of the origin in the DNS record cache 116 as queries and answers pass through. For example, the proxy DNS server 104 receives a DNS query from the client device 102 for the origin domain and accesses the DNS record cache 116 to determine whether the queried resource record is cached, and if one is located, determines whether the queried resource record is valid (e.g., unexpired). In one embodiment, the DNS record cache 116 caches the results of previous DNS queries received by the proxy DNS server 104. The time each resource record is valid is set by a time-to-live (TTL) value associated with the resource record. If DNS record cache 116 includes a valid resource record that answers the query (one that is unexpired), the proxy DNS server 104 returns the resource record to the client device 102.

If the proxy DNS server 104 cannot answer the query because it does not have a valid cached answer, the proxy DNS server 104 queries one or more other DNS nameservers of the domain for the answer. For example, proxy DNS server 104 accesses its configuration for the domain (which provides the IP address(es) of the authoritative nameservers for the domain) and queries the authoritative DNS nameserver 110 for the domain. The proxy DNS server 104 is not configured to operate as a recursive nameserver and, in embodiments, does not recursively resolve the target name in the DNS hierarchy.

If the proxy DNS server 104 receives an answer to the query from the authoritative DNS nameserver 110, the proxy DNS server 104 may then transmit a DNS response to the requesting device that includes the answer, and it may cache the resource record of the answer in the DNS record cache 116. If the proxy DNS server 104 does not receive an answer to the query from the authoritative DNS nameserver 110 (e.g., the nameservers are down or otherwise inaccessible and did not respond), the proxy DNS server 104 accesses the expired resource record in the DNS record cache 116 and transmits an answer to the requesting device with the expired resource record. The proxy DNS server 104 may, in the background, periodically query the authoritative DNS nameserver 110 for the resource record, and if the authoritative DNS nameserver 110 answers, update the resource record in the DNS record cache 116 (the record is no longer expired). The proxy DNS server 104 may periodically query the authoritative DNS nameserver for the resource record for a threshold number of times and/or for a threshold amount of time.

There may be multiple origin authoritative DNS nameservers (e.g., for redundancy or load balancing). In an embodiment, the proxy DNS server 104 uses a round-robin approach when querying the particular origin authoritative DNS nameserver. The proxy DNS server 104 may choose the origin authoritative DNS nameserver probabilistically based on which nameserver is most performant in recent queries (e.g., which has been the fastest nameserver). If a particular origin authoritative DNS nameserver does not respond to a query, the proxy DNS server 104 may transmit the query to another one of the origin authoritative DNS nameservers, and so on. If each of the origin authoritative DNS nameservers does not respond to the query, the proxy DNS server 104 may determine that the query failed to resolve.

In one embodiment, the proxy DNS server 104 is one of a plurality of distributed proxy servers. In such embodiments, when a requesting device (e.g., client device 102) transmits a DNS query for the domain, the DNS query is received by the closest one of the proxy DNS servers as determined by the anycast protocol. The proxy DNS server 104 receiving the DNS query can be determined based on geographic proximity to the requesting device, based on mean response time of each of the plurality of distributed proxy servers, based on a randomized or round robin algorithm, or a combination of factors. In one embodiment, each of the plurality of distributed proxy servers includes a cache. In one embodiment, the plurality of distributed proxy servers utilize a shared cache.

In an embodiment, the proxy DNS server 104 supports the EDNS-Client-Subnet (ECS) option as defined in Request for Comments 7871, May 2016. The ECS option allows for a portion of the client's IP address to be included in the DNS query so that geographically-specific DNS answers can be generated based on the client's IP address. The proxy DNS server 104 transmits the client's IP subnet (as defined in the ECS) along with the DNS query to the origin authoritative DNS nameserver 110. To support ECS, the DNS record cache 116 is segmented such that different subnets have different caches. For instance, if the proxy DNS server 104 receives a query from a client at 1.2.3.0/24, the proxy DNS server 104 caches the answer from the origin authoritative DNS nameserver 110 only for that /24 subnet so that if the proxy DNS server 104 receives a query from a client at a different subnet (e.g., 1.2.9.0/24), the proxy DNS server 104 will transmit the query to the origin authoritative DNS nameserver 110 instead of responding with the cached answer for the 1.2.3.0/24 subnet (assuming that there is not a cached answer for that different subnet). In an embodiment, if an answer to a query is not in the segmented cache for the client's IP subnet and the origin authoritative DNS nameserver 110 does not answer the query, the proxy DNS server 104 may transmit the answer from a different segmented cache, which may be a stale record.

Figure 2:
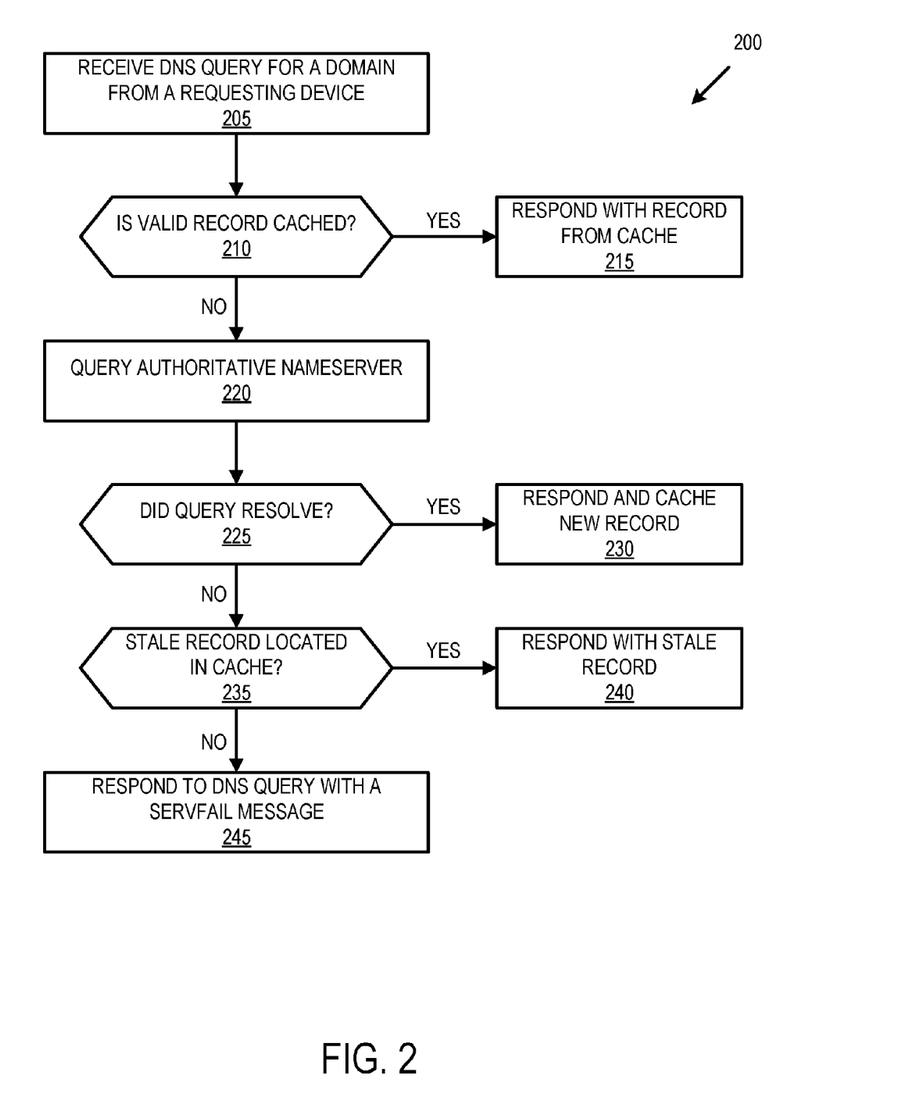
FIG. 2 is a flow diagram illustrating exemplary operations for managing DNS queries using a proxy DNS server according to one embodiment.

FIG. 2 is a flow diagram illustrating exemplary operations for managing DNS queries using a proxy DNS server according to one embodiment. The operations of FIG. 2 will be described with respect to being performed by a proxy DNS server (e.g., 104) acting as a proxy server between a client device (e.g., 102) and an origin's DNS server (e.g., authoritative DNS nameserver 110). At operation 205, the proxy DNS server 104 receives a DNS query associated with a domain of the origin authoritative DNS nameserver 110 (referred herein as the origin domain). As an example, the DNS query may be for an Address record for the domain "www.example.com". The proxy DNS server 104 receives the DNS query from a client device (e.g., client device 102) or from another DNS server (e.g., the recursive DNS nameserver 106). The proxy DNS server 104 receives the query for the resource record of the origin domain because it is acting as the authoritative nameserver for the origin domain. In one embodiment, the proxy DNS server 104 receives the query from the requesting device (out of multiple proxy DNS servers that are anycasted to the same IP address) because it is the closest to the requesting device according to an anycast implementation.

Flow 200 then proceeds to operation 210 where the proxy DNS server 104 determines whether a resource record that answers the query for the requested domain is located within the DNS record cache 116. If a resource record that answers the query for the requested domain is in the DNS record cache 116, the proxy DNS server 104 determines whether the located cached record is valid. In one embodiment, the proxy DNS server 104 determines whether the cached record is valid by evaluating a time to live (TTL) value. The TTL value indicates the amount of time the resource record should be treated as valid, where the expiration of the amount of time indicates the resource record is expired. The TTL value may be set by the origin authoritative DNS nameserver 110. In an embodiment where ECS is supported and the query includes the ECS option, the proxy DNS server 104 accesses the segment of the DNS record cache 116 corresponding to the IP subnet of the client to determine whether the resource record is in the DNS record cache 116 and whether it is valid.

If the located cached record is valid, flow 200 moves to operation 215 and the proxy DNS server 104 answers the DNS query with the cached record by transmitting the cached record to the client device 102. For example, the proxy DNS server 104 retrieves the cached resource record and transmits a DNS response message with the cached resource record to the client device 102.

If a resource record is not found in the DNS record cache 116 or the located cached record is not valid, then in one embodiment, flow 200 moves to operation 220 and the proxy DNS server 104 sends the DNS query for the requested domain to the origin authoritative DNS nameserver 110. In an embodiment where ECS is supported and the query includes the ECS option, and the resource record is not in the segment of the DNS record cache 116 corresponding to the IP subnet of the client, then flow moves to operation 220 and the proxy DNS server 104 sends the DNS query to the origin authoritative DNS nameserver 110 and includes the ECS option.

At operation 225, the proxy DNS server 104 determines whether the DNS query resolved. The DNS query may not be resolved if the origin authoritative DNS nameserver 110 is down or otherwise inaccessible. If the DNS query resolved, the proxy DNS server 104 receives a DNS response from authoritative DNS nameserver 110, the DNS response including the requested resource record. The flow then proceeds to operation 230. If the DNS query is not resolved, the proxy DNS server 104 may fail to receive a response from the authoritative DNS nameserver 110, and the flow proceeds to operation 235.

At operation 230, the proxy DNS server 104 responds to the query with the requested resource record received from the origin authoritative DNS nameserver 110. The proxy DNS server 104 caches the updated resource record received from the origin authoritative DNS nameserver 110. If ECS is supported by the origin authoritative DNS nameserver 110, the proxy DNS server 104 caches the resource record received from the origin authoritative DNS nameserver 110 in a segment of the cache corresponding to the client IP's subnet. In one embodiment, the proxy DNS server 104 establishes a TTL value for the resource record, which may be the same as received from the origin authoritative DNS nameserver 110. In such embodiments, in response to subsequent queries for the resource record for the domain received by the proxy DNS server 104, the proxy DNS server 104 retrieves and transmits the cached resource record without performing further DNS query processes while the resource record remains valid (e.g., until the expiration of the TTL value).

At operation 235, in response to determining the query failed to resolve, the proxy DNS server 104 determines whether there is a stale record located in the DNS record cache 116 (a cached record that answers the query but has expired). When there is a stale resource record located in the DNS record cache 116, at operation 240, the proxy DNS server 104 responds to the DNS query with the stale resource record. In one embodiment, the proxy DNS server 104 indicates to the client device 102 that the response to the DNS query includes a stale resource record, while in other embodiments it does not. The proxy DNS server 104 may indicate the resource record is stale by including a string of text, setting a bit indicator, or providing another form of indication. When there is not a stale resource record located in the DNS record cache 116, at operation 245, the proxy DNS server 104 responds to the DNS query with a server failure (SERVFAIL) response. In an embodiment where ECS is supported and the query includes the ECS option, and the resource record is not in the segment of the DNS record cache 116 corresponding to the IP subnet of the client, the proxy DNS server 104 may check whether the resource record is in another segment of the DNS record cache 116 (not corresponding to the IP subnet of the client), and if one exists (which may be stale in an embodiment), the proxy DNS server 104 responds to the DNS query with the resource record from another segment of the DNS record cache 116, according to an embodiment.

In one embodiment, the proxy DNS server 104 compares the amount of time since the expiration of the TTL value with a threshold amount of time, and when the amount of time since the expiration of the TTL value exceeds the threshold amount of time, the proxy DNS server 104 does not transmit the stale resource record in response to the DNS query. In such embodiments, even if a stale (e.g., expired) resource record exists, the proxy DNS server 104 responds to the DNS query with the SERVFAIL response. In another embodiment, the proxy DNS server 104 responds with a stale resource record in response to a DNS query for as long as that resource record remains in the DNS record cache 116. How long a resource record stays in the DNS record cache 116 depends on the size of the cache, cache pressure, and record popularity (e.g., less popular records are evicted before more popular records).

In one embodiment, the proxy DNS server 104 is one of a plurality of distributed proxy servers that are anycasted to the same IP address. In such embodiments, in response to determining that a query to the origin authoritative DNS nameserver 110 failed to resolve and/or determining that the proxy DNS server 104 stores an invalid DNS resource record, the proxy DNS server 104 transmits a query to one or more other proxy DNS servers in the plurality of distributed proxy servers for the resource record. If one of the one or more other proxy DNS servers has the resource record in cache (and optionally only if the resource record is valid), that proxy DNS server answers the query with the resource record to the requesting proxy DNS server 104.

In one embodiment, the proxy DNS server 104 mitigates the risks of denial-of-service (DoS) and distributed denial-of-service (DDoS) attacks by evaluating received DNS requests. For example, the proxy DNS server 104 can analyze the source of a DNS request, and can detect if a coordinated attack is being conducted, e.g., one or more IP addresses are flooding the proxy DNS server 104. In another example, the proxy DNS server 104 can identify requesting devices that are on a blacklist. The proxy server 104 can detect and mitigate the effects of a DDoS attack from preventing the flood of requests from reaching the origin authoritative DNS nameserver 110).

Figure 3:
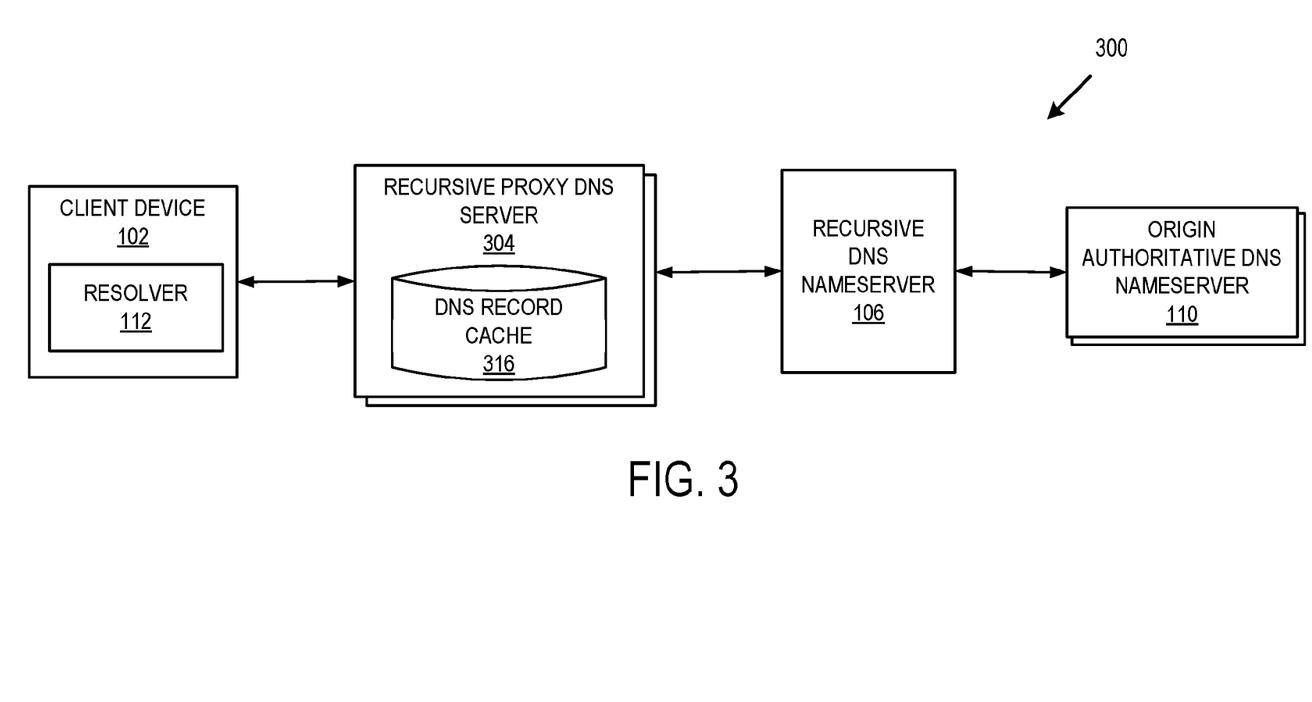
FIG. 3 illustrates an example system including a proxy server for managing DNS queries using a proxy DNS server for a recursive DNS server using techniques described herein according to one embodiment.

While embodiments have described a proxy server for an origin authoritative DNS nameserver, similar techniques may be used for a proxy server for a recursive nameserver. FIG. 3 illustrates an example system 300 including a proxy server for managing DNS queries using a proxy DNS server for a recursive DNS server using techniques described herein. FIG. 3 includes a client device 102, a recursive proxy DNS server 304, a recursive DNS nameserver 106, and an origin authoritative DNS nameserver 110. Although not illustrated in FIG. 3, the recursive DNS nameserver 306 may communicate with other nameservers such as root nameservers. The devices depicted in FIG. 3 can communicate and exchange data via the internet.

In the example of FIG. 3, the DNS queries from the client device 102 may be received by the recursive proxy DNS server 304. The recursive proxy DNS server 304 may receive queries from another recursive DNS server (not shown in FIG. 3 for simplicity). The recursive proxy DNS server 304 may be located within a network of the client device 102 (e.g., in a home router, in a business router, etc.), or may be located outside of the network of the client device 102. The recursive proxy DNS server 304 acts as a proxy for the recursive DNS nameserver 106. The proxy DNS server 304 does not permanently store DNS records of the recursive DNS nameserver 106 or the origin authoritative DNS nameserver 110. However, the recursive proxy DNS server 304 caches DNS records as queries and answers pass through. For example, the recursive proxy DNS server 304 receives a DNS query from the client device 102 for the origin domain and accesses the DNS record cache 316 to determine whether the queried resource record is cached, and if one is located, determines whether the queried resource record is valid (e.g., unexpired). In one embodiment, the DNS record cache 316 caches the results of previous DNS queries received by the recursive proxy DNS server 304. The time each resource record is valid is set by a time-to-live (TTL) value associated with the resource record. If DNS record cache 316 includes a valid resource record that answers the query (one that is unexpired), the recursive proxy DNS server 304 returns the resource record to the client device 102.

If the recursive proxy DNS server 304 cannot answer the query because it does not have a valid cached answer, the recursive proxy DNS server 304 queries the recursive DNS nameserver 106 for the answer. The recursive DNS nameserver 106 may recursively resolve the target name in the DNS hierarchy, including sending a query to the origin authoritative DNS nameserver 110. If the recursive proxy DNS server 304 receives an answer to the query from recursive DNS nameserver 106, the recursive proxy DNS server 304 may then transmit a DNS response to the requesting device that includes the answer, and it may cache the resource record of the answer in the DNS record cache 316. If the recursive proxy DNS server 304 does not receive an answer to the query from the recursive DNS nameserver 106 (e.g., the recursive DNS nameservers 106 are down or otherwise inaccessible and did not respond), the recursive proxy DNS server 304 accesses the expired resource record in the DNS record cache 316 and transmits an answer to the requesting device with the expired resource record. The recursive proxy DNS server 304 may, in the background, periodically query the recursive DNS nameserver 106 for the resource record, and if the recursive DNS nameserver 106 answers, update the resource record in the DNS record cache 316 (the record is no longer expired). The recursive proxy DNS server 304 may periodically query the recursive DNS nameserver 106 for the resource record for a threshold number of times and/or for a threshold amount of time.

There may be multiple recursive DNS nameservers (e.g., for redundancy or load balancing). In an embodiment, the recursive proxy DNS server 304 uses a round-robin approach when querying the particular recursive DNS nameserver. The recursive proxy DNS server 304 may choose the recursive DNS nameserver probabilistically based on which nameserver is most performant in recent queries (e.g., which has been the fastest nameserver). If a particular recursive DNS nameserver does not respond to a query, the recursive proxy DNS server 304 may transmit the query to another one of the recursive DNS nameservers, and so on. If each of the recursive DNS nameservers does not respond to the query, the recursive proxy DNS server 304 may determine that the query failed to resolve.

In an embodiment, the recursive proxy DNS server 304 supports the ECS option. The recursive proxy DNS server 304 transmits the client's IP subnet (as defined in the ECS) along with the DNS query to the recursive proxy DNS server 304. To support ECS, the DNS record cache 316 is segmented such that different subnets have different caches. For instance, if the recursive proxy DNS server 304 receives a query from a client at 1.2.3.0/24, the recursive proxy DNS server 304 caches the answer only for that /24 subnet so that if the recursive proxy DNS server 304 receives a query from a client at a different subnet (e.g., 1.2.9.0/24), the recursive proxy DNS server 304 will transmit the query to the recursive proxy DNS server 304 instead of responding with the cached answer for the 1.2.3.0/24 subnet (assuming that there is not a cached answer for that different subnet). In an embodiment, if an answer to a query is not in the segmented cache for the client's IP subnet and the recursive DNS nameserver 106 does not answer the query, the recursive proxy DNS server 304 may transmit the answer from a different segmented cache, which may be a stale record.

Figure 4:
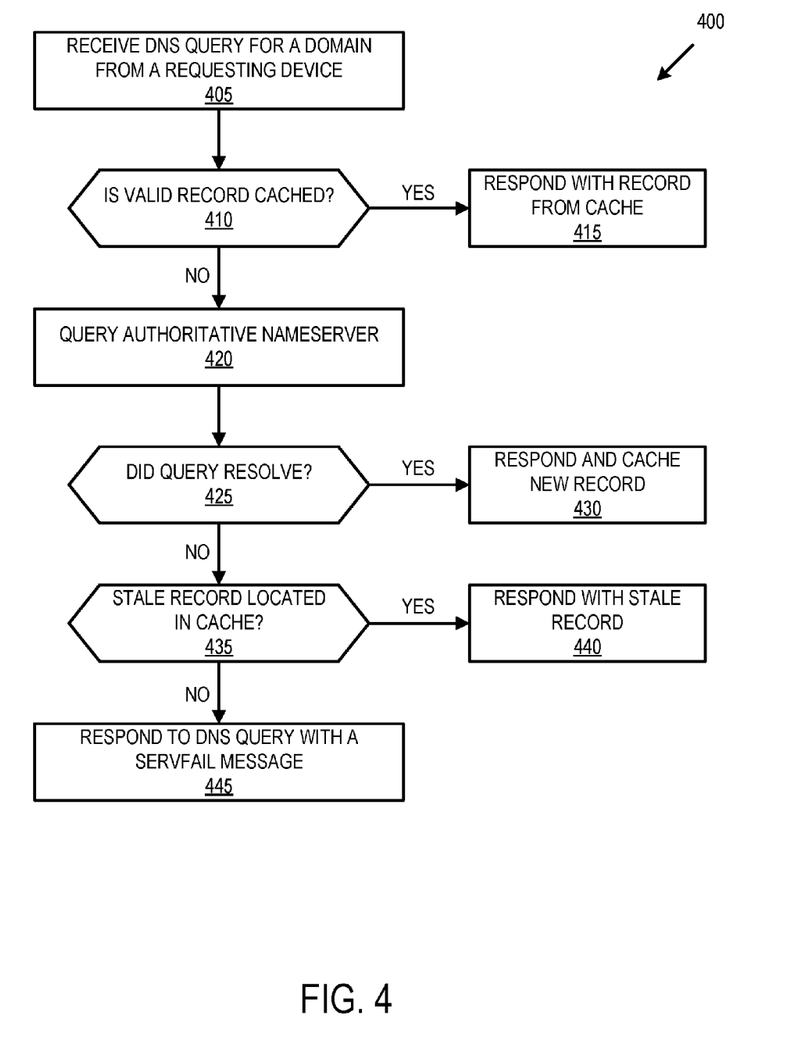
FIG. 4 is a flow diagram illustrating exemplary operations for managing DNS queries using a proxy DNS server for a recursive DNS server according to one embodiment.

FIG. 4 is a flow diagram illustrating exemplary operations for managing DNS queries using a proxy DNS server for a recursive DNS nameserver according to one embodiment. The operations of FIG. 4 will be described with respect to being performed by a recursive proxy DNS server (e.g., 304) acting as a proxy server between a client device (e.g., 102) and a recursive DNS nameserver (e.g., 106). At operation 405, the recursive proxy DNS server 304 receives a DNS query associated with a domain of the origin authoritative DNS nameserver 110 (referred herein as the origin domain). The recursive proxy DNS server 304 receives the DNS query from a client device (e.g., client device 102) or from another DNS server.

Flow 400 then proceeds to operation 410 where the recursive proxy DNS server 304 determines whether a resource record that answers the query for the requested domain is located within the DNS record cache 316. If a resource record that answers the query for the requested domain is in the DNS record cache 316, the recursive proxy DNS server 304 determines whether the located cached record is valid. In one embodiment, the recursive proxy DNS server 304 determines whether the cached record is valid by evaluating a time to live (TTL) value. The TTL value indicates the amount of time the resource record should be treated as valid, where the expiration of the amount of time indicates the resource record is expired. The TTL value may be set by the recursive proxy DNS server 304 to reflect the amount of time the record is cached. In an embodiment where ECS is supported and the query includes the ECS option, the recursive proxy DNS server 304 accesses the segment of the DNS record cache 316 corresponding to the IP subnet of the client to determine whether the resource record is in the DNS record cache 316 and whether it is valid.

If the located cached record is valid, flow 400 moves to operation 415 and the recursive proxy DNS server 304 answers the DNS query with the cached record by transmitting the cached record to the client device 102. For example, the recursive proxy DNS server 304 retrieves the cached resource record and transmits a DNS response message with the cached resource record to the client device 102.

If a resource record is not found in the DNS record cache 316 or the located cached record is not valid, then in one embodiment, flow 400 moves to operation 420 and the recursive proxy DNS server 304 sends the DNS query for the requested domain to the recursive DNS nameserver 106. In an embodiment where ECS is supported and the query includes the ECS option, and the resource record is not in the segment of the DNS record cache 316 corresponding to the IP subnet of the client, then flow moves to operation 420 and the recursive proxy DNS server 304 sends the DNS query to the recursive DNS nameserver 106 and includes the ECS option.

At operation 425, the recursive proxy DNS server 304 determines whether the DNS query resolved. The DNS query may not be resolved if any of the nameservers (e.g., the recursive DNS nameserver 106 and/or the origin authoritative DNS nameserver) is down or otherwise inaccessible. If the DNS query resolved, the recursive proxy DNS server 304 receives a DNS response from the recursive DNS nameserver 106, the DNS response including the requested resource record. The flow then proceeds to operation 430. If the DNS query is not resolved, the recursive proxy DNS server 304 may fail to receive a response from the recursive DNS nameserver 106, and the flow proceeds to operation 435.

At operation 430, the recursive proxy DNS server 304 responds to the query with the requested resource record received from the recursive DNS nameserver 106. The recursive proxy DNS server 304 caches the updated resource record received from the recursive DNS nameserver 106. If ECS is supported, the recursive proxy DNS server 304 caches the resource record received from the recursive DNS nameserver 106 in a segment of the cache corresponding to the client IP's subnet. In one embodiment, the recursive proxy DNS server 304 establishes a TTL value for the resource record, which may account for the time the record has been cached. In such embodiments, in response to subsequent queries for the resource record for the domain received by the recursive proxy DNS server 304, the recursive proxy DNS server 304 retrieves and transmits the cached resource record without performing further DNS query processes while the resource record remains valid (e.g., until the expiration of the TTL value).

At operation 435, in response to determining the query failed to resolve, the recursive proxy DNS server 304 determines whether there is a stale record located in the DNS record cache 316 (a cached record that answers the query but has expired). When there is a stale resource record located in the DNS record cache 316, at operation 440, the recursive proxy DNS server 304 responds to the DNS query with the stale resource record. In one embodiment, the recursive proxy DNS server 304 indicates to the client device 102 that the response to the DNS query includes a stale resource record, while in other embodiments it does not. The recursive proxy DNS server 304 may indicate the resource record is stale by including a string of text, setting a bit indicator, or providing another form of indication. When there is not a stale resource record located in the DNS record cache 316, at operation 445, the recursive proxy DNS server 304 responds to the DNS query with a server failure (SERVFAIL) response. In an embodiment where ECS is supported and the query includes the ECS option, and the resource record is not in the segment of the DNS record cache 316 corresponding to the IP subnet of the client, the recursive proxy DNS server 304 may check whether the resource record is in another segment of the DNS record cache 316 (not corresponding to the IP subnet of the client), and if one exists (which may be stale in an embodiment), the recursive proxy DNS server 304 responds to the DNS query with the resource record from another segment of the DNS record cache 316, according to an embodiment.

In one embodiment, the recursive proxy DNS server 304 compares the amount of time since the expiration of the TTL value with a threshold amount of time, and when the amount of time since the expiration of the TTL value exceeds the threshold amount of time, the stale resource record is not transmitted in response to the DNS query. In such embodiments, even if a stale (e.g., expired) resource record exists, the recursive proxy DNS server 304 responds to the DNS query with the SERVFAIL response. In another embodiment, the recursive proxy DNS server 304 responds with a stale resource record as long as that resource record remains in the DNS record cache 316. How long a resource record stays in the DNS record cache 316 depends on the size of the cache, cache pressure, and record popularity (e.g., less popular records are evicted before more popular records).

Figure 5:
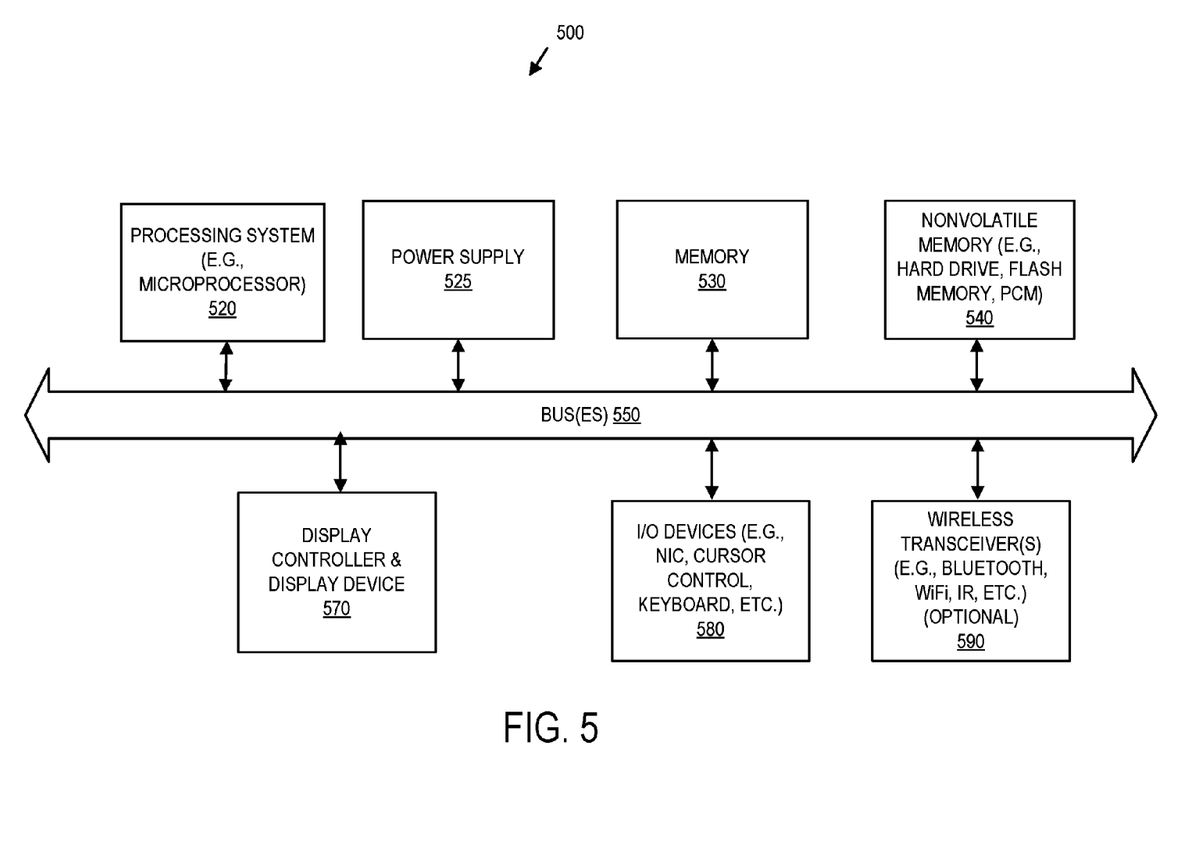
FIG. 5 illustrates an exemplary format of a computer system that may be used according to some embodiments.

As illustrated in FIG. 5, the computer system 500, which is a form of a data processing system, includes the bus(es) 550 which is coupled with the processing system 520, power supply 525, memory 530, and the nonvolatile memory 540 (e.g., a hard drive, flash memory, Phase-Change Memory (PCM), etc.). The bus(es) 550 may be connected to each other through various bridges, controllers, and/or adapters as is well known in the art. The processing system 520 may retrieve instruction(s) from the memory 530 and/or the nonvolatile memory 540, and execute the instructions to perform operations described herein. The bus 550 interconnects the above components together and also interconnects those components to the display controller & display device 570, Input/Output devices 580 (e.g., NIC (Network Interface Card), a cursor control (e.g., mouse, touchscreen, touchpad, etc.), a keyboard, etc.), and the optional wireless transceiver(s) 590 (e.g., Bluetooth, WiFi, Infrared, etc.). In one embodiment, the devices and/or the domain name servers may take the form of the computer system 500.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server for managing Domain Name System (DNS) queries, comprising:
   receiving, by the proxy server for an authoritative nameserver of a domain, a query from a requesting device directed to the authoritative nameserver, the query for a resource record associated with the domain, wherein the proxy server does not permanently store resource records for the domain, wherein the proxy server appears to be the authoritative nameserver of the domain but is not the authoritative name server for the domain, wherein the proxy server is not a recursive nameserver, and wherein the proxy server receives the query from the requesting device instead of the authoritative nameserver for the domain because a name of the authoritative nameserver resolves to an IP address of the proxy server instead of the authoritative nameserver;
   determining that a cached record for the queried resource record is in cache available to the proxy server but is expired;
   querying the authoritative nameserver of the domain for the resource record responsive to the determination that the cached record for the queried resource record is in cache available to the proxy server but is expired;
   determining that the authoritative nameserver of the domain failed to respond with the queried resource record; and
   responsive to the determination that the authoritative nameserver of the domain failed to respond with the queried resource record, performing the following:
      accessing, in the cache available to the proxy server, the cached record for the resource record that is expired, and
      transmitting the cached record for the resource record that is expired to the requesting device.

2. The method of claim 1, further comprising:
   prior to accessing the cached record for the resource record that is expired,
      transmitting the query to another authoritative nameserver of the domain, and
      determining the another authoritative nameserver failed to respond with the queried resource record.

3. The method of claim 1, further comprising:
   periodically querying the nameserver of the domain for the resource record; and
   responsive to receiving the resource record from the nameserver of the domain, caching the resource record in the cache available to the proxy server.

4. The method of claim 1, wherein the query from the requesting device is received by the proxy server via anycast addressing.

5. The method of claim 1, wherein the proxy server is one of a plurality of distributed proxy servers, and wherein the method further comprises:
   in response to the determination that the nameserver of the domain failed to respond with the queried resource record, querying another proxy server of the plurality of distributed proxy servers for the resource record.

6. The method of claim 1, further comprising:
receiving, by the proxy server for the authoritative nameserver of the domain, a second query from the requesting device directed to the authoritative nameserver of the domain, the second query for the resource record associated with the domain;
determining that the cached record for the queried resource record is valid; and
transmitting the cached record for the resource record to the requesting device.

7. The method of claim 1, further comprising:
determining an IP subnet of the requesting device; and
wherein determining that the cached record for the queried resource record is in cache available to the available to the proxy server but is expired includes determining that the cached record is in a segment of the cache corresponding to the IP subnet of the requesting device.

8. An apparatus, comprising:
a proxy server for an authoritative nameserver of a domain server including a set of processors and a set of one or more non-transitory computer-readable storage mediums storing instructions that, when executed by the set of processors, cause the set of processors to perform the following operations:
receive, by the proxy server for the authoritative nameserver of a domain, a query from a requesting device directed to the authoritative nameserver, the query for a resource record associated with the domain, wherein the proxy server does not permanently store resource records for the domain, wherein the proxy server appears to be the authoritative nameserver of the domain but is not the authoritative name server for the domain, wherein the proxy server is not a recursive nameserver, and wherein the proxy server receives the query from the requesting device instead of the authoritative nameserver for the domain because a name of the authoritative nameserver resolves to an IP address of the proxy server instead of the authoritative nameserver;
determine that a cached record for the queried resource record is in cache available to the proxy server but is expired;
query the authoritative nameserver of the domain for the resource record responsive to the determination that the cached record for the queried resource record is in cache available to the proxy server but is expired;
determine that the authoritative nameserver of the domain failed to respond with the queried resource record; and
responsive to the determination that the authoritative nameserver of the domain failed to respond with the queried resource record, perform the following:
access, in the cache available to the proxy server, the cached record for the resource record that is expired, and
transmit the cached record for the resource record that is expired to the requesting device.

9. The apparatus of claim 8, wherein the instructions further cause said processors to perform the following:
prior to accessing the cached record for the resource record that is expired,
transmit the query to another authoritative nameserver of the domain, and
determine the another authoritative nameserver failed to respond with the queried resource record.

10. The apparatus of claim 8, wherein the instructions further cause said processors to perform the following:
periodically query the nameserver of the domain for the resource record; and
responsive to receiving the resource record from the nameserver of the domain, cache the resource record in the cache available to the proxy server.

11. The apparatus of claim 8, wherein the query from the requesting device is received by the proxy server via anycast addressing.

12. The apparatus of claim 8, wherein the proxy server is one of a plurality of distributed proxy servers, and wherein the instructions further cause said processors to perform the following:
in response to the determination that the nameserver of the domain failed to respond with the queried resource record, query another proxy server of the plurality of distributed proxy servers for the resource record.

13. The apparatus of claim 8, wherein the instructions further cause said processors to perform the following:
receive, by the proxy server for the authoritative nameserver of the domain, a second query from the requesting device directed to the authoritative nameserver of the domain, the second query for the resource record associated with the domain;
determine that the cached record for the queried resource record is valid; and
transmit the cached record for the resource record to the requesting device.

14. The apparatus of claim 8, wherein the instructions further cause said processors to perform the following:
determine an IP subnet of the requesting device; and
wherein the determination that the cached record for the queried resource record is in cache available to the available to the proxy server but is expired includes a determination that the cached record is in a segment of the cache corresponding to the IP subnet of the requesting device.

15. A non-transitory machine-readable storage medium that provides instructions that, when executed by a processor, cause the processor to perform operations comprising:
receiving, by a proxy server for an authoritative nameserver of a domain, a query from a requesting device directed to the authoritative nameserver, the query for a resource record associated with the domain, wherein the proxy server does not permanently store resource records for the domain, wherein the proxy server appears to be the authoritative nameserver of the domain but is not the authoritative name server for the domain, wherein the proxy server is not a recursive nameserver, and wherein the proxy server receives the query from the requesting device instead of the authoritative nameserver for the domain because a name of the authoritative nameserver resolves to an IP address of the proxy server instead of the authoritative nameserver;
determining that a cached record for the queried resource record is in cache available to the proxy server but is expired;
querying the authoritative nameserver of the domain for the resource record responsive to the determination that the cached record for the queried resource record is in cache available to the proxy server but is expired;

determining that the authoritative nameserver of the domain failed to respond with the queried resource record; and responsive to the determination that the authoritative nameserver of the domain failed to respond with the queried resource record, performing the following:

accessing, in the cache available to the proxy server, the cached record for the resource record that is expired, and transmitting the cached record for the resource record that is expired to the requesting device.

16. The non-transitory machine-readable storage medium of claim 15, further comprising:

prior to accessing the cached record for the resource record that is expired, transmitting the query to another authoritative nameserver of the domain, and determining the another authoritative nameserver failed to respond with the queried resource record.

17. The non-transitory machine-readable storage medium of claim 15, further comprising:

periodically querying the nameserver of the domain for the resource record; and responsive to receiving the resource record from the nameserver of the domain, caching the resource record in the cache available to the proxy server.

18. The non-transitory machine-readable storage medium of claim 15, wherein the query from the requesting device is received by the proxy server via anycast addressing.

19. The non-transitory machine-readable storage medium of claim 15, wherein the proxy server is one of a plurality of distributed proxy servers, and wherein the method further comprises:

in response to the determination that the nameserver of the domain failed to respond with the queried resource record, querying another proxy server of the plurality of distributed proxy servers for the resource record.

20. The non-transitory machine-readable storage medium of claim 15, further comprising:

receiving, by the proxy server for the authoritative nameserver of the domain, a second query from the requesting device directed to the authoritative nameserver of the domain, the second query for the resource record associated with the domain;

determining that the cached record for the queried resource record is valid; and transmitting the cached record for the resource record to the requesting device.

21. The non-transitory machine-readable storage medium of claim 15, further comprising:

determining an IP subnet of the requesting device; and wherein determining that the cached record for the queried resource record is in cache available to the available to the proxy server but is expired includes determining that the cached record is in a segment of the cache corresponding to the IP subnet of the requesting device.

* * * * *